No. 765,767. PATENTED JULY 26, 1904.
T. CARROLL.
CASH REGISTER.
APPLICATION FILED OCT. 19, 1903.
NO MODEL. 6 SHEETS—SHEET 2.

No. 765,767. PATENTED JULY 26, 1904.
T. CARROLL.
CASH REGISTER.
APPLICATION FILED OCT. 19, 1903.
NO MODEL. 6 SHEETS—SHEET 4.

Witnesses
Inventor
Thomas Carroll
Attorneys

No. 765,767. PATENTED JULY 26, 1904.
T. CARROLL.
CASH REGISTER.
APPLICATION FILED OCT. 19, 1903.
NO MODEL. 6 SHEETS—SHEET 6.

Witnesses
Inventor
Thomas Carroll
By Frank Parker Davis
J. B. Hayward
Attorneys

No. 765,767.

Patented July 26, 1904.

UNITED STATES PATENT OFFICE.

THOMAS CARROLL, OF DAYTON, OHIO, ASSIGNOR TO NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 765,767, dated July 26, 1904.

Application filed October 19, 1903. Serial No. 177,671. (No model.)

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

My invention relates to improvements in cash-registers; and I have selected as the type of machine to which to apply these improvements the register shown and described in Letters Patent issued to me on July 24, 1900, and July 1, 1902, numbered, respectively, 654,226 and 703,639. However, it is to be understood that these improvements are equally applicable to various other forms of cash-registers.

One of the distinctive features of the machines described in the aforesaid Letters Patent is that of having a series of accounting devices each one of which may be moved into operative position by means of a special setting element or lever, whereby a segregated analysis of the various transactions is secured; and it is among the purposes of my invention to provide an additional bank of keys for such series of accounting devices, with interlocking means between said keys and said setting-lever, whereby only that key may be depressed which corresponds with the accounting device previously set for operation by said lever, and also to provide means whereby when this setting-lever is in certain positions any one of said keys may be operated.

A further purpose of my improvements is to provide a latching means for said lever together with various locking means intermediate said latch and the operating mechanism of the machine and said series of keys.

Among the other purposes of my improvements are the following: to provide an improved flash-releasing mechanism for the special indicator; to lock the machine from operation while any of the amount-keys are being moved from initial to final position and to release said lock when the keys have been fully depressed to final position; to lock the main operating mechanism of the machine from operation until the depression of one of the series of special keys; to provide an improved mechanism in connection with the check-printing devices whereby even though the operator may set the machine so as not to issue a check yet upon the movement of the aforesaid setting-lever into certain positions a check will be printed and issued upon the operation of the machine, and, finally, in cooperation with the main totalizing-counter of the machine I have provided means for preventing the operation of such totalizing-counter when the aforesaid setting-lever is moved into these special positions.

Since the general type of the machine to which my improvements are applied is described in detail in the aforesaid Letters Patents, I shall give only such description of its general construction as is necessary to a clear understanding of the nature of my improvements, and reference may be had to said patents for a more complete description.

Referring to the accompanying drawings, Fig. 3 represents a vertical section from front to rear, taken on a plane between the setting-lever for the counters and the bank of special keys, showing in detail the locking devices for said keys. Fig. 3ª represents a detail view of the mechanisms for operating the flashes. Fig. 8 represents a sectionalized rear elevation of the check printing and feeding devices, showing also the consecutive numbering and dating mechanism and certain devices for adjusting the check-feed. Fig. 8ª represents a detail sectional view of the "on" and "off" knob.

Figure 4:
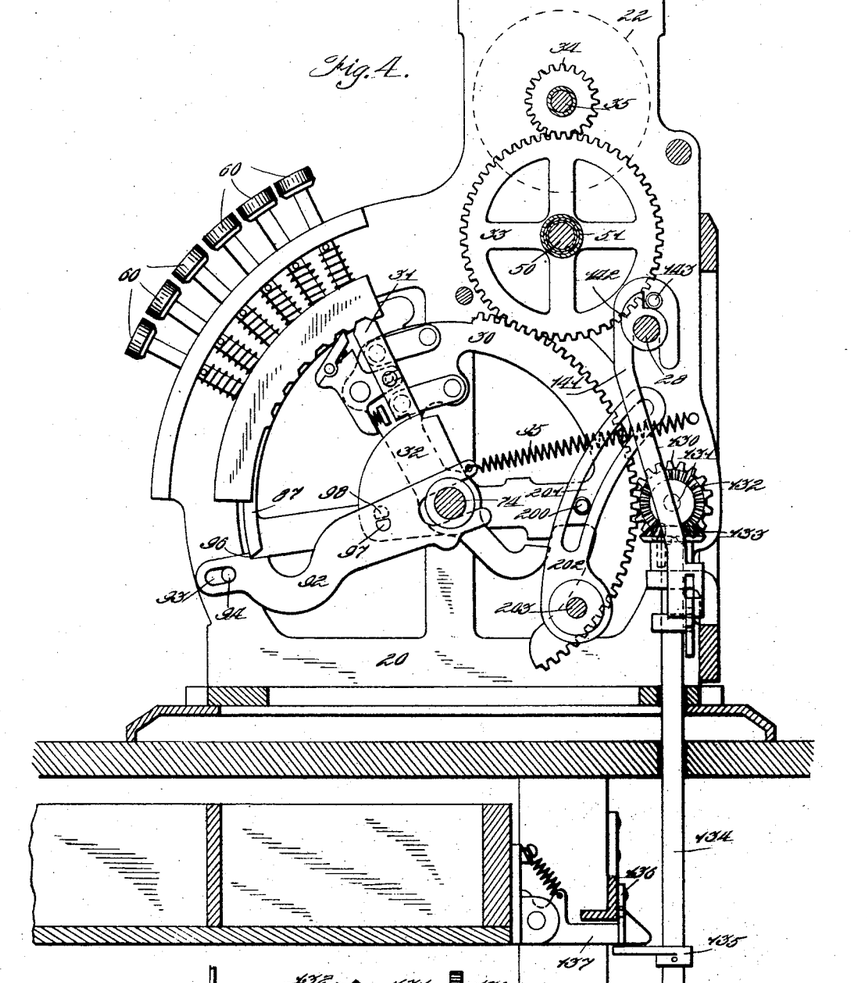
Fig. 4 represents a vertical section from front to rear, showing the multiple drawer connections and also one of the locking devices for the operating mechanism.
Figure 5:
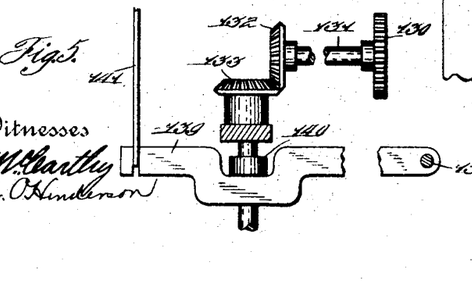
Fig. 5 represents a detail rear elevation of the multiple drawer setting and unlatching mechanism.
Figure 14:
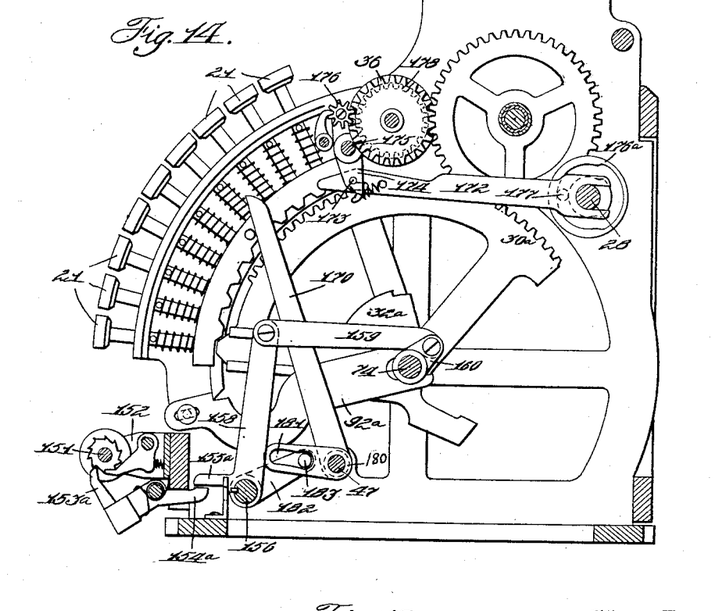
Fig. 14 represents a vertical section of the machine, showing the mechanism for throwing out the totalizing-counter.

Referring to the accompanying drawings, 20 represents the frame of the machine; 21, the amount-keys; 22, the indicators, and 23 the operating-handle. By means of suitable gears 24, 25, 26, and 27 the rotary movement of the crank-handle 23 imparts rotary movement to the main operating-shaft 28. The general operation is set forth at length in the various patents; but in brief such operation is as follows: Referring to Fig. 4, the segment 30 is connected with the latch 31, and said latch is adapted to be connected with and disconnected from the operating-plate 32, which is oscillated at each revolution of the crank-handle 23. Upon the operation of said crank-handle the operating-segment is returned to "zero" and is then moved to its proper set position, as determined by the particular key depressed, at which point the latch 31 is disconnected from the oscillating plate 32. There is one of these operating-segments 30 for each bank of keys, and each segment meshes with an intermediate gear 33, which in turn meshes with gears 34, journaled upon a transverse shaft 35 and made fast to the indicators 22. Also by means of the intermediate gears 33 the respective counter-wheels 36 (see Fig. 14) are operated. Thus upon the depression of any amount-key and the turning of the crank-handle 23 the indicators are set to proper position and the counter-wheels are moved to proper position to register the amount of the transaction.

Figures 1, 2:
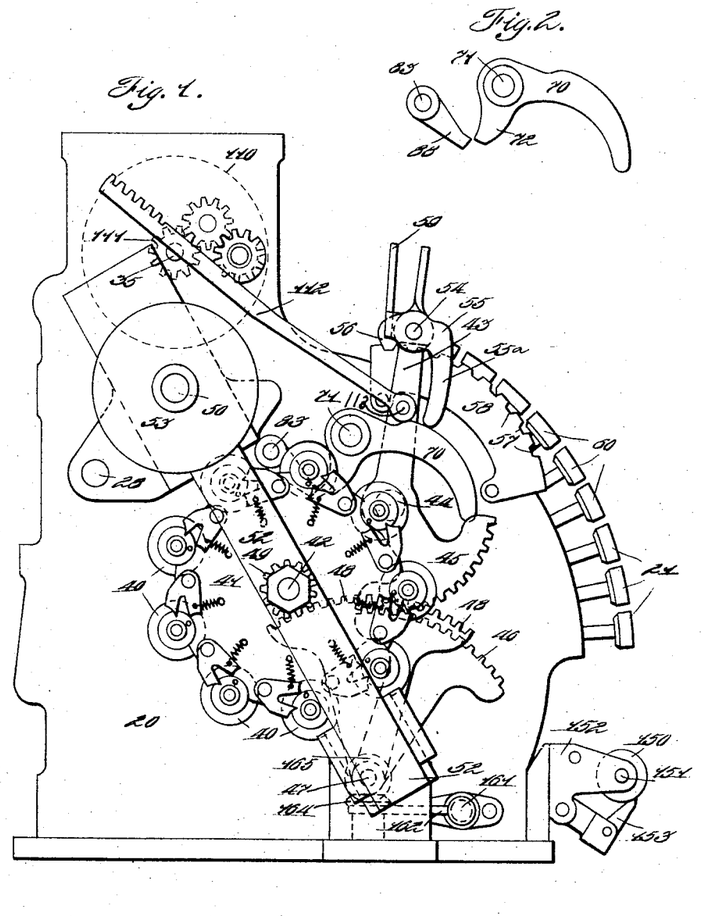
Figure 1 represents a side elevation of the left-hand end of the machine.
Fig. 2 represents a detail side view of certain levers connected with the key-locking mechanism.

The aforesaid counter-wheels 36 constitute the registering-wheels of the totalizing-counter, which gives a record of the total amount registered upon the machine; but in order to give an analysis of all the various transactions, and thus segregate such transactions into certain classes, I have provided a series of nine independent counters 40, (see Fig. 1,) which are mounted in a rotary drum 41, rotating upon a shaft 42. An adjustable setting-lever 43, pivoted about the shaft 44, carries upon its downward extremity a segment-rack 45, which meshes with an upwardly-extending segment-rack 46, which is fast upon a shaft 47, and also fast upon this same shaft 47 is another segment-rack, 48, which meshes with a pinion 49, journaled upon the shaft 42 and fast to the drum 41. By this means it is obvious that the movement of the lever 43 will impart a rotary movement to the drum 41, thereby serving to bring into operative position whichever of the independent counters it is desired to be operated. The actuating means for these independent counters comprise segment-racks journaled upon the shaft 50, but not shown herein, and these racks are moved by the various operating-segments 30 and the intermediate gear-wheels 33 through the mediation of the nested sleeves 51. (See Fig. 4.) The drum 41 is mounted in a sliding carriage 52, and at each operation of the machine this carriage 52 is reciprocated by means of a box-cam-and-pin connection, (not shown herein,) said box-cam being formed on the inner side of the disk 53. This movement for operating the separate independent counters is set forth in detail in the aforesaid Letters Patent, No. 703,639, and I have not described it in detail here, since it constitutes no part of my present invention, and it will be apparent from this construction that when the operating-lever 43 is moved to a certain position to bring its corresponding counter into position to be actuated not only will the totalizing-counter be actuated, but the independent counter 40 will also be actuated to a corresponding extent, except in certain cases hereinafter to be described, wherein when the independent counter is actuated the totalizing-counter is thrown out of operation. Pivoted at 54 at the upper end of the lever 43 is a latch 55 in the shape of a bell-crank lever, having a downwardly-extending arm 55ª, and the rearward portion of this latch is formed with a nose 56, which engages notches 57, formed in a stationary setting-plate 58. Attached to the rearward side of this latch is a thumb-piece 59, which when pressed toward the upper end of the lever 43 will release the nose 56 from engagement with the notches 57, and the operator by thus releasing the latch by pressing this thumb-piece may move the lever to any desired position and then release the thumb-piece, whereupon the latch will be allowed to move into its proper notch to hold the lever 43 from displacement. There are nine of these notches 57, and they are appropriately marked on the outside casing of the machine with designations to show the character of the registrations which are being made upon each of the independent counters, and in this particular instance I have provided six of these notches with the ordinary clerks' initials, so that six of the independent counters are used to register and to keep separate the sales made by the six independent clerks, and the three other notches and their corresponding counters I have used to register the amounts of the special transactions, such as "received on account," "charge," and "paid out."

Figures 3, 3A:
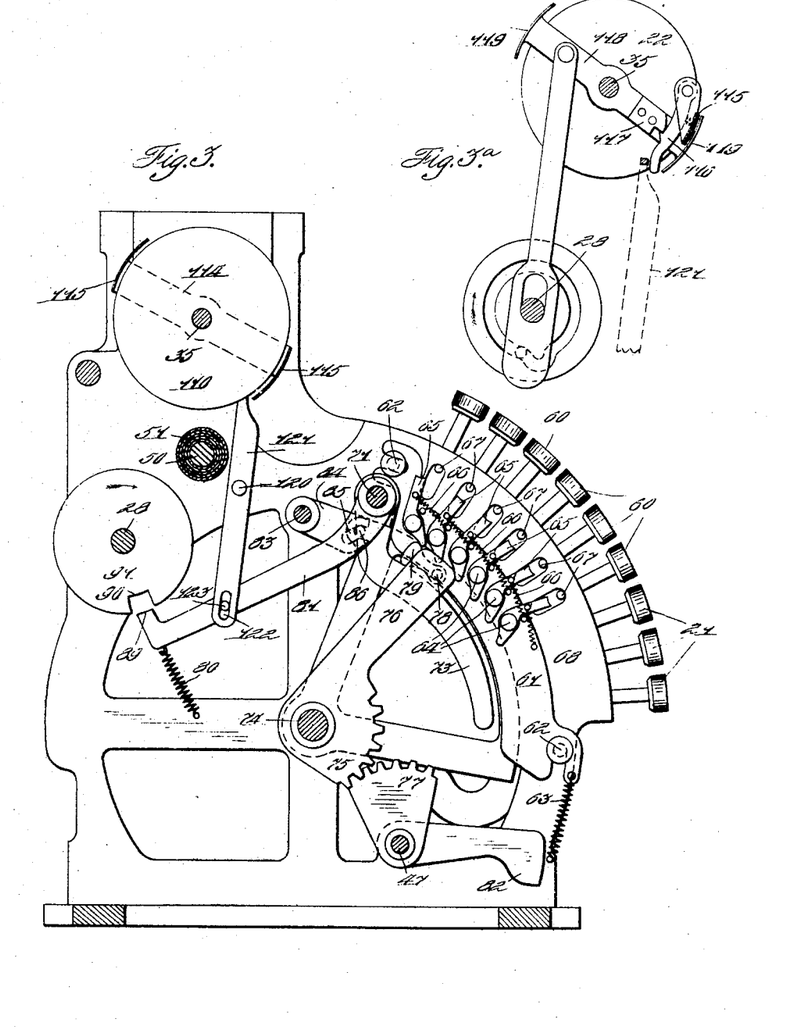

Situated adjacent to the setting-lever 43 is a series of push-keys 60 similar to the amount-keys, but bearing designations of the various clerks, and there are six of these keys in number and their arrangement corresponds to the arrangement of the aforesaid notches 56, so that for each clerk's key there is a corresponding position of the lever 43, which will bring that clerk's counter into operative position. Thus upon operating the machine each clerk will first set the lever 43 into position to bring his counter into position to be operated and will then press the key 60 which bears his designation, and in order to avoid any unintentional or accidental missetting of the lever to a position not corresponding to the particular clerk's key which should be depressed I have provided an intelocking mechanism between the lever and these keys and the operating mechanism of the machine, whereby the machine will be locked from operation unless the clerk's key depressed corresponds to the position to which the lever has been set. Situated below the bank of the clerks' keys 60 is a curved plate 61, (see Fig. 3,) which slides upon and is guided by pins 62 and is normally spring-drawn downward by a spring 63. Pivoted upon this plate at 64 are separate locking-dogs 65, which are normally drawn by springs 66 into such position that their upper ends lie in the path of pins 67, formed upon the stems of the keys 60, which pins project through slots in the stationary side plate 68. The aforesaid downwardly-extending arm 55ª of the latch 55 normally rests against a curved arm 70 (see Fig. 1) of a bell-crank lever, which is fast upon a shaft 71, journaled in the main frame, and has a shorter downwardly-extending portion 72, as shown in detail in Fig. 2. Also fast to the shaft 71 is a downwardly-extending curved lever 73, (see Fig. 3,) which is in lateral alinement with the aforesaid dogs 65. Journaled upon a transverse shaft 74, which is suitably mounted in the main frame, is a segment-plate 75, having an upwardly-extending arm 76 and meshing with another segment-plate, 77, which is fast upon the shaft 47. The upper end of the arm 76 has pivoted to it at 78 an unlocking-dog 79, formed with an enlarged head, which is adapted to engage the lower ends of the locking-dogs 65. From this construction it will be obvious that upon the movement of the lever 43, whereby, as previously explained, the shaft 47 is oscillated, the segment-plate 77 will also be oscillated, thereby imparting a similar oscillating movement to the arm 76 and causing the unlocking-dog 79 to move under the locking-dog 65 successively, and the situation of the various parts is such that when the lever is in its uppermost position, with the nose 56 of the latch 55 in the uppermost notch 57, the unlocking-dog 79 will be below the uppermost locking-dog 65 ready to unlock the uppermost clerk's key. However, this unlocking movement is not produced directly by the movement of the lever 43 to its various positions, although it is apparent that such construction might just as well serve the broad purpose; but I prefer to effect this unlocking through the medium of the latch 55. When the thumb-piece 59 of said latch is pressed toward the lever 43 by the operator, the arm 55ª presses downward against the curved arm 70, and thereby rocks the shaft 71, and such rocking also carries the curved lever 73 slightly downward, so that the unlocking-dog 79 will slide over the upper surface of this curved lever 73 without coming in contact with the locking-dogs 65; but when the latch 55 is released, so that the nose 56 drops into engagement with the notch 57, the curved arm 70 is again free to move upward, which it does under the tension of a spring 80, attached to a locking-lever 81, which extends rearward from and is fast to the aforesaid shaft 71, the purpose of which locking-lever will be later described. Since this upward movement of the arm 70 carries with it the curved lever 73, the unlocking-dog 79 is then forced against the lower end of the locking-dogs 65, so as to move the upper end of said dog out of the path of the pin 67, formed on the clerk's key. Thus while the lever 43 is unlatched none of the clerks' keys can be depressed; but when the lever is latched in position that clerk's key can be depressed which corresponds in designation to the notch 57, with which the latch is engaged, and only that one key can be depressed, the remainder of the keys being locked, and thus is effected a selective unlocking of these keys according to the adjustment of the setting-lever. It will be apparent, however, that when the clerk is to make a record of a special transaction — such as "received on account," "charge," or "paid out"—it will be desirable that he may move the setting-lever to position to bring the proper special counter into position to be operated and then depress his own clerks' keys, and in order that any one of the clerks may use his clerk's key in conjunction with these special-transaction counters I have provided means whereby when the setting-lever is moved into these positions for the special transactions any one of the clerks' keys may be operated. The mechanism for effecting this comprises an arm 82, (see Fig. 3,) which is made fast to the rock-shaft 47 and is in lateral alinement with the sliding plate 61, which carries the locking-dog 65, and the construction is such that when the setting-lever 43 has been moved to the three lower notches, which represent the special transactions, this arm 82 will be raised on the rocking of the shaft 47, as heretofore explained, and will force the plate 61 upward, thereby carrying all of the locking-dogs 65 bodily upward, so that their upper ends no longer lie in the path of the stop-pins 67. Thus when the lever is moved to any one of these special transactions any one of the clerks' keys may be depressed, and there are no extra special keys for these special transactions, there being only six keys in the bank of clerks' keys.
In order to provide against the movement of the setting-lever 43 after a clerk's key has been depressed and also, vice versa, to lock the clerks' keys while the lever is being moved, I have provided a rock-shaft 83, (see Fig. 3,) to which is made fast an arm 84, formed with a slot 85, into which slot projects a pin 86, formed on the upper end of the detent-plate 87 of the bank of clerks' keys. There is also made fast to this rock-shaft 83 an arm 88, (see Fig. 2,) which is in lateral alinement with the arm 72 of the bell-crank lever, which is fast upon the shaft 71 and is rocked by the movement of the latch 55. On the depressing of any of the clerks' keys the detent-plate 87 is raised and through the slot-and-pin connection rocks the arm 84 upward, thereby also rocking upward the arm 88 into the path of the arm 72, so that the curved arm cannot be depressed, and the latch 55 cannot, therefore, be moved to release the lever 43, and likewise when the latch 55 is first moved before the clerk's key is depressed the arm 72 moves over the arm 88, and thereby prevents the shaft from being rocked, so that the detent-plate 87 is also locked, and no clerk's key can be depressed so long as the latch 55 is depressed and the lever is not in one of its setting positions. If desired, this rocking of the shaft 83 may be utilized to unlock the main operating-shaft by means of a suitable locking cam and arm in a manner similar to that shown in the aforesaid patents, the purpose of which being that the machine will be locked from operation until a clerk's key has been depressed.
I have not shown the locking mechanism in this particular form, but have devised a different means of producing this same result, to be later described. I have, however, provided a lock for the machine while the lever is being moved or, in fact, while the latch 55 is operated to allow the setting-lever to be moved. This comprises the above-mentioned arm 81, (see Fig. 3,) which is fast upon the rock-shaft 71 and extends rearward and at its outer end is formed with a nose 89 to engage a recess 90, formed in a locking-cam 91, which is fast to the main operating-shaft 28. Upon the operation of the latch 55, whereby the curved arm 70 is rocked downward, as heretofore explained, and the shaft 71 is rocked, the locking-arm 81 will be raised, so that the nose 89 engages the recess 90, and thereby locks the operating-shaft from movement. It is thus obvious that not only can no clerk's key be depressed, but the machine itself is further locked from movement while the setting-lever is being moved or, in fact, is ready to be moved by the release of the latch 55.

The device for locking the machine from operation until a clerk's key has been depressed is shown in Fig. 4. When the detent-plate 87 for the bank of clerks' keys is moved upward by the depression of a key, so as to latch the key in operative position, this detent-plate is held in its upward position by means of a retaining-bar 92, which is formed at its forward end with a slot 93, engaging a guide-pin 94, and is bifurcated at its rearward end to straddle the shaft 74, and the retaining-bar is normally spring-drawn rearward by means of a spring 95. When no key is operated, the retaining-bar is held in forward position by the engagement of the detent-plate 87 with a shoulder 96, formed on the upper side of the retaining-bar, and in such normal position a pin 97, formed on the side of said bar, lies directly in the path of a similar pin 98, formed on the side of the operating-plate 32, thus preventing said operating-plate from being oscillated downward upon the revolution of the operating-handle, and thereby locking the machine. When, however, any clerk's key is depressed, the detent-plate 87 is raised and the shoulder 96 of the retaining-bar is released from engagement with the detent-plate, thus allowing the bar to spring rearward and withdraw the pin 97 from the path of the pin 98, and thus unlock the machine. Since this escapement of the retaining-bar does not take place until the detent is moved to its upper position, the machine remains locked until the clerk's key is fully depressed, and the key will then remain locked in position, since the upper surface of the retaining-bar holds the detent-plate 87 from being returned to normal position, thereby latching the key in operated position, and thus it is impossible to unlock the machine by partially depressing a clerk's key and then releasing the same without having it latched in position.

I have also provided a locking mechanism to prevent manipulation of the machine by slightly depressing an amount-key and holding the same in such slightly-depressed position until after the operating-handle has been moved far enough to allow the operating-segments and the latches attached thereto to move beyond the stopping position as normally predetermined by the keys and then complete the depression of the already partially-operated keys, whereby no amount would be registered, nor would it be displayed by the indicators; but the key in the amount-bank would remain in depressed position after the operating-handle had been moved to a certain extent, and it would appear to the observer that an amount-key had been depressed and that the machine had not properly registered and indicated this amount. Journaled upon the shaft 47 (see Fig. 9) is a bell-crank lever having a curved forward portion 100, formed with two slots 101 and 102, the upper one of which slots is engaged by a pin 103, formed on the detent-plate 87ª for the bank of amount-keys, and the lower one of which slots is engaged by a pin 104, formed on the retaining-bar 92ª. The rearward portion of said bell-crank lever comprises an upwardly-extending arm 105, which has at its upper end a laterally-projecting lug 106, which is adapted to be moved into the path of a lug 107, formed upon the side of the operating-plate 32ª. Upon the initial depression of any key the detent-plate 87ª is moved upward, and the pin 103 carries the arm 100 rearward and also carries the arm 105 rearward, so that the lug 106 lies in the path of the lug 107 and the operating-plate 32ª cannot be oscillated downward, and the machine is thereby locked from operation. The parts remain in this locking position until the key has been fully depressed, at which point, as heretofore explained, the retaining-bar 92ª springs rearward to lock the detent-plate 87ª in operated position with the key latched in depressed position, and the pin 104 thereupon gives a further movement to the arm 100, and thereby carries the arm 105 still farther rearward, so that the locking-lug 106 is out of the path of the lug 107, and the machine is free to be operated. It results from this construction that the machine is locked from operation while the key is being moved from its initial to its final position, and upon the arrival of the key to its final position the retaining-bar is released, the key is latched in depressed position, and the machine is unlocked. I have shown this device connected with a series of amount-keys; but it is to be understood that it could be used as well upon any bank of keys in which it is desired to lock the machine during the movement of such keys from initial to final position and at the same time leave the machine free to be operated when no key in that bank has been depressed or as soon as any key has been fully depressed.

*Special indicator and flash.*—There is the usual form of indicator connected with the bank of clerks' keys; but in order to give an indication of special transactions I have provided a special indicator 110, (see Figs. 1 and 3,) journaled upon the shaft 35, having fast to it a pinion 111, which by means of suitable intermediate gears is rotated to a proper position by means of a rack-bar 112, pivoted at its forward end at 113 to the setting-lever 43, which connections are set forth in detail in the aforesaid patents. Also journaled upon this shaft 35 is a flash-arm 114, (see Fig. 3,) carrying at its outer end a screen-plate 115, to which is attached a latch-pawl 116, which is adapted to latch over a projection 117, formed upon a flash-arm 118 of the main indicator screen-plate 119, and thereby move with the same into position to expose the indicators. This operation of latching the special indicator screen-plate to the main screen-plate is old and is set forth in the aforesaid Patent No. 703,639; but my improvement consists in releasing said special screen-plate by the operation of the latch 55 of the setting-lever 43. Pivoted at 120 to the main frame (see Fig. 3) is a releasing-lever 121, the downwardly-extending portion of which has formed in it a slot 122, into which projects a pin 123, formed on the above-described locking-lever 81, and the upper end of the lever 121 is adapted to engage the aforesaid latch-pawl 116 of the special indicator-flash. When the lever-latch 55 is operated, as before described, to release the setting-lever 43 and the shaft 71 is rocked, as also previously described, the upward movement of the locking-arm 81 moves the lower end of the lever 121 rearward and moves the upper end of said lever forward in such manner as to release the latch-pawl 116 from engagement with the main indicator-flash, thereby allowing the special indicator-flash to drop and conceal the special indication, which dropping movement thus takes place as soon as the latch 55 is operated to enable the clerk to set the setting-lever 43 for a new transaction.

*Multiple-drawer attachment.*—I have also shown my improvements connected with the multiple-drawer attachment, the operation of which is similar to that described in the aforesaid Patent No. 654,226. The operating-segment 30, (see Fig. 4,) connected with the bank of clerks' keys 60, meshes with a pinion 130, mounted upon a shaft 131, suitably journaled in the main frame, and this shaft carries a beveled gear 132, which meshes with a corresponding beveled gear 133, which is splined upon the upper end of vertical finger-shaft 134, which shaft has attached to it the various fingers 135, which are adapted to be rotated and be brought under the respective releasing-arms 136, which are engaged by the drawer-latches 137. Pivoted at 138 to the main frame is a lifting-bar 139, which engages a collar 140, fast to the shaft 134, and the outer end of this lifting-bar 139 is connected with a lifting-rod 141, which extends upward from said bar 139 at its upper end and is hooked to surround the main operating-shaft 28, which shaft has formed upon it a cam 142, which engages an antifriction-roller 143 on the lifting-bar 141. Upon the operation of any one of the clerks' keys the movement of its operating-segment will rotate the gear-wheel 130 in such manner as to set the shaft 134 to bring the proper finger 135 under the releasing-arm 136, and upon the operation of the shaft 28 the cam 142 will lift the lifting-rod 141 by means of the roller 143, and the lifting-bar 139 will raise the collar 140, and thereby raise the finger-shaft 134 and cause the releasing-arm 136 to release the drawer-latch 137 and allow the drawer to open under its spring tension. There is a separate drawer for each clerk, and the fingers 135 are so spaced about the shaft that the rotation of said shaft will bring such finger into operative position and will release such drawer as corresponds to the designation of the clerk's key depressed. This multiple-drawer attachment I have not described in detail, since it constitutes no part of my present invention, and for a further description reference may be had to the aforesaid Patent No. 654,236.

Figure 15:
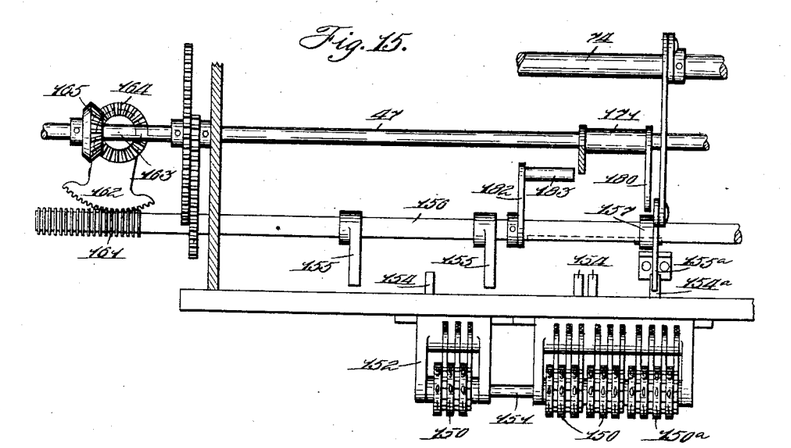
Fig. 15 represents a top plan view of the special counters and their actuating mechanism.

*Special counters.*—In order to keep a record of the number of operations of the special counters, together with the total number of operations of the machine ordinarily known as the "customers' counter," I have provided a series of special counters 150 and 150$^a$. (Shown in Figs. 14 and 15.) These counters are mounted upon a shaft 151, which is journaled in suitable brackets 152, attached to the main frame. The operating-pawls 153 and 153$^a$ for these counters have backwardly-extending arms 154 and 154$^a$, which are adapted to be engaged, respectively, by operating-fingers 155 and 155$^a$. The fingers 155 are fast upon a rock-shaft 156, while the finger 155$^a$, which actuates the customers' counter and comprises the forward end of a bell-crank lever, is fast to a collar 157, splined upon said rock-shaft 156, and the upward arm 158 of said bell-crank lever has pivoted to it a link 159, which is attached to an arm 160, fast to the oscillating shaft 74. The rock-shaft 156 has at its left-hand end annular teeth 161, which are engaged by the teeth of a segment-rack 162, pivoted at 163 to the main frame and having formed at its pivotal point a beveled gear 164, which meshes with a vertical beveled gear 165, fast upon the rock-shaft 47. Upon the movement of the setting-lever 43 and the consequent rocking of the shaft 47, as heretofore explained, the beveled gears 164 and 165 will obviously rotate the segment-rack 162, and thereby shift the rock-shaft 156 laterally, and the fingers 155 are so situated upon this rock-shaft 156 that only one of said fingers will be moved into position over its corresponding arm 154, being brought over that particular arm of the special counter corresponding to the counter set for operation on the special transaction, and upon the subsequent operation of the machine after the setting-lever has been moved to set position the oscillation of the shaft 74 will likewise oscillate the rock-shaft 156 through the medium of the link 159 and the aforesaid bell-crank lever and the collar 157, and thus the downward movement of the finger 155$^a$ of said bell-crank lever will also serve to actuate the customers' counter 150$^a$ through the medium of the arm 154$^a$. By this construction the customers' counter is operated at each operation of the machine, while only that special counter is operated which corresponds with the independent special-transaction counter set for operation by the setting-lever 43. This construction is described in detail in the aforesaid Letters Patent No. 703,639, and my improvement consists in connecting with this special counter-setting mechanism means for throwing out of operation the totalizing-counter. The general mechanism for throwing said counter out of operation is described in detail in the aforesaid Patent No. 703,639 and comprises a throw-out bar 170, (see Fig. 14,) which is fast on a collar 171, journaled upon the rock-shaft 47, and the upper end of this bar 170 is adapted to engage and lift the operating-bar 172, which at its forward end is hooked to engage a pin 173, formed on the lower end of a lever 174, which is pivoted at 175 and carries at its upper end an idle pinion 176. The rearward end of the bar 172 is bifurcated and straddles the main operating-shaft 28, and by means of a cam-groove disk 176$^a$, fast to said shaft, and a pin 177, fast to said bar and engaging said cam-groove, the bar 172 is reciprocated at each operation of the machine, and thereby carries the idle pinion 176 into mesh with the pinions 178, mounted by the side of the counter-operating pinion 36 and serving when in mesh with said pinions 178 to cause the counter to move with said counter-operating pinion 36 and when not in mesh with the same to allow the pinion 36 to move without operating the registering-wheels, and when the throw-out bar 170 is raised into vertical position its upper end engages the forward end of the arm 172 and lifts its hook out of engagement with the pin 173, so that the reciprocation of the bar 172 will not carry the idle pinion into mesh with the gears 179, and thereby the registering-wheels will not be operated. This particular movement for throwing the totalizing-counter out of operation is described in detail in the aforesaid Patent No. 703,639, and since it forms no part of my present invention I shall not give a fuller description of these operating parts, but will refer to said patent for such description. Fast to the collar 171 is a forwardly-extending arm 180, formed with a slot 181. Fast upon the rock-shaft 156 is a rearwardly-extending arm 182, carrying at its outer end a laterally-projecting pin 183, which is adapted to enter the slot 181. However, the arm 182 is so situated upon the shaft 156 that when the lever 43 is set at any one of the positions corresponding to the clerks' designations—that is, the six upper notches 57—the pin 183 is not in engagement with the slot 181; but when the lever 43 is moved into any one of the three lower positions, these being for the special transactions, the shaft 156 is then moved so far laterally that the pin 183 engages the slot 181 in no matter which of the three positions the setting-lever may be placed. Thus upon the rocking of the shaft 156 upon the operation of the machine in the manner heretofore described the arm 182 will also be rocked upward, and the pin 183 will also carry the arm 181 upward, and thus carry the throw-out bar 170 upward and rearward in such manner as to lift the operating-bar 172 and throw the totalizing-counter out of operation in the manner heretofore described.

*Printing mechanism.*—I will now describe the printing attachment, by means of which a record of each transaction is printed upon a detail-strip and is also printed upon a check to be delivered to the customer. The main features of this printing attachment are already set forth in detail in my copending application, Serial No. 153,196, filed April 18, 1903, and the particular improvements embodied in the present application will be set forth hereinafter.

Figures 6, 7:
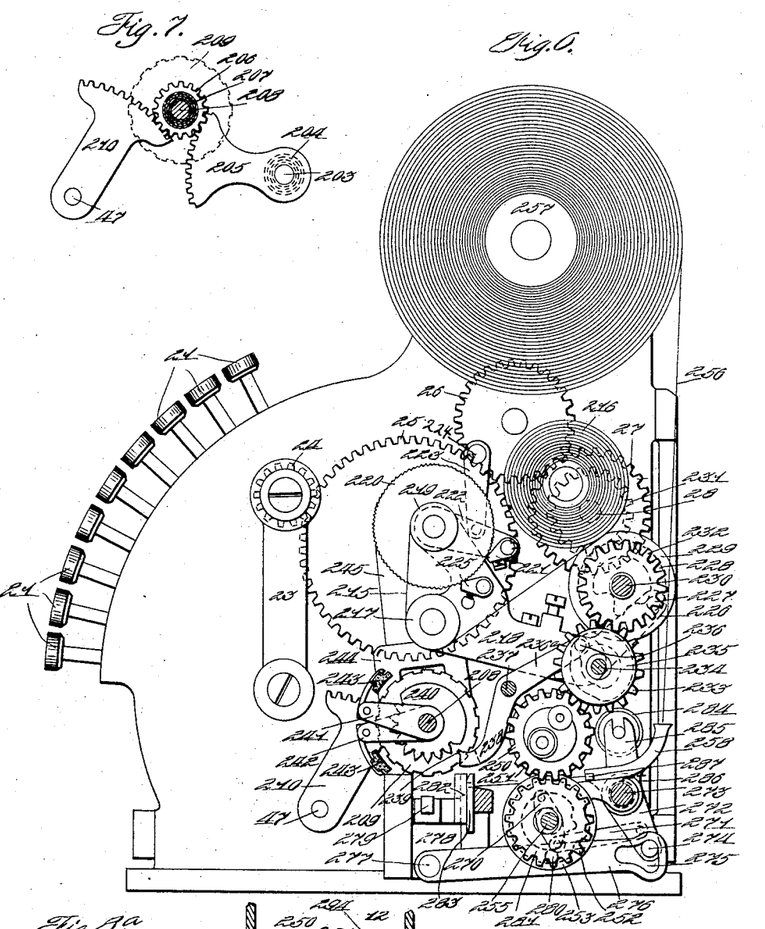
Fig. 6 represents a side elevation of the right-hand end of the machine with the side plate of the printing attachment removed, showing the printing mechanism.
Fig. 7 represents a detail side view of the type-wheels and the gears for setting the same.

Each operating-segment 30ª for the banks of amount-keys (see Fig. 9) and the operating-segment 30 for the bank of clerks' keys (see Fig. 4) have mounted upon their rearward portions antifriction-rollers 200, which engage slots 201, formed in curved arms 202. The particular arm 202 corresponding to the bank of clerks' keys is fast to a transverse shaft 203, (see Fig. 4,) and the other arms 202 for the banks of amount-keys are made fast to suitable nested sleeves 204, surrounding said shaft 203. (See Fig. 9.) The shaft 203 extends through the right-hand side frame of the machine and has fast upon its outer end a segment-rack 205, (see Fig. 7,) and each of the nested sleeves 204 also extends through the right-hand side frame of the machine and has attached at its outer end and adjacent to the aforesaid segment 205 similar segments 205, and these segments mesh with pinions 206, which are suitably connected by nested sleeves 207 and the shaft 208 to the type-wheels 209. In order that the setting-lever 43 will also set a type-wheel to print the designation of the special independent counter 40 set for operation, I have made fast to the rock-shaft 47 a segment-rack 210, (see Fig. 7,) which meshes with a pinion 206, similar to and mounted adjacent to the other pinions 206, and by a suitable sleeve connection this pinion also sets one of the type-wheels 209 into printing position. However, since the bank of clerks' keys sets a printing-wheel into position to print a record of the clerk's key depressed, it is not essential that the type-wheel connected with the setting-lever 43 should bear similar characters designating the various clerks' counters, for this would simply amount to a double printing of the same transaction, and these characters denoting the clerk's initials may obviously be omitted from the type-wheel connected with said setting-lever; but it is obviously necessary that this latter type-wheel should have characters to denote the nature of the special transaction, so that when the setting-lever is moved into the three lower positions to bring into operative position one of the three counters for the special transactions the type-wheel connected with said lever will then be set to print the abbreviated designations of such transaction. These type-wheels 209 have duplicate characters upon their peripheries in order that an impression may be taken from both the top and the bottom of said wheels, and thus print both a check and a detail strip simultaneously, as hereinafter described. It will be understood, of course, that the various curved slots 201 are so shaped and the arms 202 so positioned that the movement of the operating-segments as limited by the push-keys will cause the respective type-wheels to be moved into positions to print characters corresponding to the designation of the key depressed.

The detail-strip (see Fig. 6) is unwound from a storage-roll 216, is led around a resilient roller 217, mounted upon a platen-lever 218, and is then led around a storage-roller 219, which roller has mounted upon it a ratchet-wheel 220, which is engaged by a feed-pawl 221, mounted upon the outer end of an arm 222, journaled upon the same shaft with the storage-roller and connected at its middle portion with an operating-arm 223, which is pivoted at 224 to the main frame. The ratchet 220 is held from backward rotation by means of a retaining-pawl 225. The platen-lever 218 is suitably pivoted at its rearward end to the main frame and has attached to it an upwardly-extending arm 226, which carries a pin 227, which engages a cam-groove 228, formed in a disk 229, which is fast to the shaft 230, and this shaft 230 is rotated at each operation of the machine by means of a suitable pinion which meshes with a pinion 231, fast to the outward extension of the main operating-shaft 28. By this means when the crank-handle 23 is rotated and the main shaft 28 is thereby rotated in the manner heretofore described the disk 229 is also rotated and the forward end of the platen 218 is carried downward, so as to bring the detail-strip into contact with the type-wheels 209, and the shape of the cam-groove 228 is such that this platen-lever 218 is reciprocated twice at each operation of the machine for the purpose hereinafter described. The shaft 230 has mounted upon its outer end a gear-wheel 232, which meshes with a gear-wheel 233, mounted upon a stub-shaft 234, projecting from the side frame of the printing attachment, and this gear-wheel 233 has formed upon its inner side a cam-groove 235, which is engaged by a pin 236, formed on the rearward end of a lever 236ª, pivoted to the side frame of the printing attachment at 237, and the forward end of this lever 236ª has attached to it a frame 238, which extends transversely across the type-wheels 209 and carries a series of alining-pawls whose noses 239 engage the respective teeth of the alining-plates 240, fast to each type-wheel. Thus by means of these intermediate gears the type-wheels are alined at the proper time to hold them firmly in set position while the printing is taking place. Journaled about the shaft 208, upon which the type-wheels are mounted, are two independent arms 241 and 242, carrying ink-pads 243, and each of these arms is suitably connected to pinions (not shown herein) journaled upon the shaft 208, which pinions are engaged by a double rack-frame 244, fast to the arms 245, which is reciprocated at each revolution of the gear-wheel 25 by means of a pin and cam-groove mechanism. (Not shown herein.) The contour of this cam-groove is such that these ink-pads are brought into position just before the platen-lever 218 is carried downward, so that the roller 217 forces the ink-pad against the type, and then the ink-pad is withdrawn, and upon the next reciprocation of the platen-lever 218 the impression is taken from the type upon the detail-strip.

The aforesaid gear-wheel 233, which carries the cam for operating the alining-pawl, as heretofore described, meshes with a gear-wheel 250, which is mounted upon the outer end of a printing-roller 251, carrying electros for printing any desired matter upon the check, and also provided with the usual consecutive numbering and dating devices, the construction of this roller being well known in the art. The gear-wheel 250 meshes with a gear-wheel 252, mounted upon the impression or feed roller 253, which roller is journaled upon the enlarged portion 254 of the shaft 255, which enlarged portion is eccentric to the bearings of said shaft, so that by rotating the shaft slightly in its bearings the feed-roller 253 may be moved toward or from the printing-roller 251, and thereby control the feeding of the check-strip 256, which check-strip is fed from a supply-roller 257 and passes down through a chute 258 and is led between the aforesaid printing-roller 251 and the feed-roller 253 and is then led below the lower surface of the type-wheels 209 to be printed upon in the manner to be described.

Figures 8, 8A:
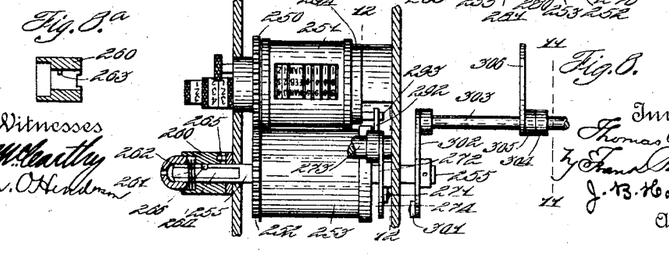

The shaft 255 protrudes through the right-hand side frame of the printing attachment and has mounted upon it a sleeve or on and off knob 260, (see Fig. 8,) which is spring-pressed inward by a spring 261, seated against a screw-cap 262, fast to the end of said shaft 255. The collar 260 has formed upon it an inwardly-projecting pin 263, (see Fig. 8ª,) which pin slides in an enlarged groove 264, formed in the shaft 255, and by means of this pin and groove the shaft 255 may be turned by hand, simply turning the sleeve 260, whereby to rock the feed-roller 253 upon its eccentric bearing, and thereby continue or discontinue the feed of the check-strip. The sleeve 260 is held in its set positions by means of a stationary pin 265, which projects into two suitable recesses in said sleeve and holds the same in either of its positions, the "on" position being for the issuing of a check and the "off" position being for the discontinuance of the check-feed. The enlargement of the groove 264 will allow the shaft 255 to have a movement independent of the sleeve 260 for the purpose later to be described; but in order that the shaft may have a still further movement it is formed with an annular groove 266, (see Fig. 8,) which groove lies normally opposite the pin 263 when the sleeve 260 is in one of its set positions, whereby if the shaft 255 is rotated farther the pin 264 will enter this annular groove 266. The construction of this on and off mechanism is shown in the aforesaid Patent No. 654,226.

The shaft 255 has fast upon it a lever 270, to the lower end of which is attached a link 271, which is connected with the lever 272, swung upon a shaft 273. The lower end of the lever 272 carries a pin 274, which projects into an L-shaped slot 275, formed in the rearward end of a platen-operating lever 276, which lever is attached at 277 to a slide 278, carrying the check-platen 279. The lever 276 has formed upon its middle portion a pin 280, which engages a cam-groove 281, formed in a disk fast upon the shaft 255. When the shaft 255 is turned in such manner as to engage the feed-roller 253 with the printing-roller 251, and thereby issue a check, the link 271 is drawn forward, thereby rocking the lever 272 forward and carrying the pin 274 into the narrow part of the L-shaped slot 275, and upon the rotation of the gear-wheel 252 as caused by the rotation of the intermediate gears connecting the same with the main rotation-shaft the engagement of the pin 280 of its cam-groove 281 will cause the platen-operating lever 276 to be lifted about the pin 274 as a fulcrum, thereby carrying the platen 279 upward and taking an impression from the type. The shape of the cam-groove 281 is such that the platen will be reciprocated twice for each revolution of the gear-wheel 252, the first reciprocation being to press the ink-pad 243 against the type, (to which position this ink-pad has previously been brought by its particular rack 244, as heretofore described,) and then as soon as the ink-pad has been withdrawn the second reciprocation of the platen takes place, whereby to take an impression upon the check-strip. The slide 278 also carries a knife-blade 282, which shears against a stationary blade 283, and thereby severs the check-strip which passes between said blades. When, however, the shaft 255 is rocked in such manner as to disengage the aforesaid feed-roller and printing-roller, and thereby prevent the issuing of a check, the link 272 is carried rearward, and the pin 274 is carried into the elongated part of the L-shaped slot 275, thereby shifting the fulcrum of the platen operating lever 276 from the pin 274 to the pivot 277, and upon the operation of the gear-wheel 252 the rearward end of the lever 276 will be lifted, being permitted to do so by the formation of the L-shaped slot, and the slide 278 and its platen 279 will remain stationary, so that the platen will not be carried against the type when no check is to be issued. In order also to prevent inking of the printing-roller 251 when the check-feed is thrown off, I have mounted the ink-roller 284 in arms 285, fast to the check-chute 258, which check-chute is carried by arms 286, journaled upon the shaft 273. The chute 258 has formed upon its forward end a lug 287, (see Fig. 13,) which is engaged by an arm 288, pivoted about the shaft 273 and projecting into engagement with a cam-disk 289, fast to the shaft 255, and thus when the shaft 255 is rocked to discontinue the feed of the checks this cam-disk 289 will force the arm 288 upward, and this arm bearing against the lug 287 will force the check-chute 258 slightly rearward, thereby carrying the ink-roller 284 out of engagement with the printing-roller 251, and upon the rocking of the shaft 255 to cause the feeding of the check-strip it is apparent that the ink-roller will be allowed to drop into engagement with the printing-roller 251, it being spring-pressed into such engagement by means of the spring 290, wound around the shaft 273.

Figures 11, 12:
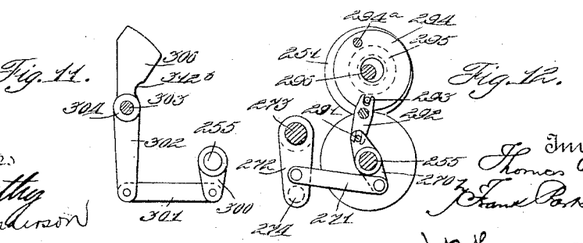
Fig. 11 represents a detail sectional view of the same, taken on the line 11 11 of Fig. 8.
Fig. 12 represents a detail sectional view of the same, taken on the line 12 12 of Fig. 8.

The lever 270, which is fast upon the shaft 255, as heretofore explained, has formed upon its upper end a pin 291, (see Fig. 12,) which engages a slot formed in a small lever 292, the upper end of which lever is formed with another slot which engages a pin 293, which is fast upon the side of a disk 294, which is pivotally mounted at 294$^a$. On the side of the main frame is formed an annular groove 295, into which projects a pin connected with the actuating-pawl for the consecutive-numbering device, which pin and pawl are not shown herein, since they form no part of my present invention; but for a more detailed description of the consecutive-numbering device reference may be had to the patent to W. Murphy, No. 541,247, dated June 18, 1895. The construction of this consecutive-numbering device is such that when the aforesaid groove 295 is concentric with the shaft 296, upon which the roller 251 rotates, the pawl for actuating the consecutive-numbering wheels is not reciprocated; but when the groove 295 is eccentric to the shaft 296 said pawl will be reciprocated and will actuate the consecutive-numbering wheels. Thus, as will be seen from Fig. 12, when the shaft 255 is rocked so as to issue a check the disk 294 is also rocked in such manner as to make the groove 295 eccentric to the shaft 296, and thereby operate the consecutive-numbering device, and when the shaft 255 is rocked so as to throw off the check-feed the groove 295 is concentric to the shaft 296 and the consecutive-numbering device is not operated, so that in this manner the consecutive number will be preserved and will be operated only when a check is issued.

Figures 9, 10, 13:
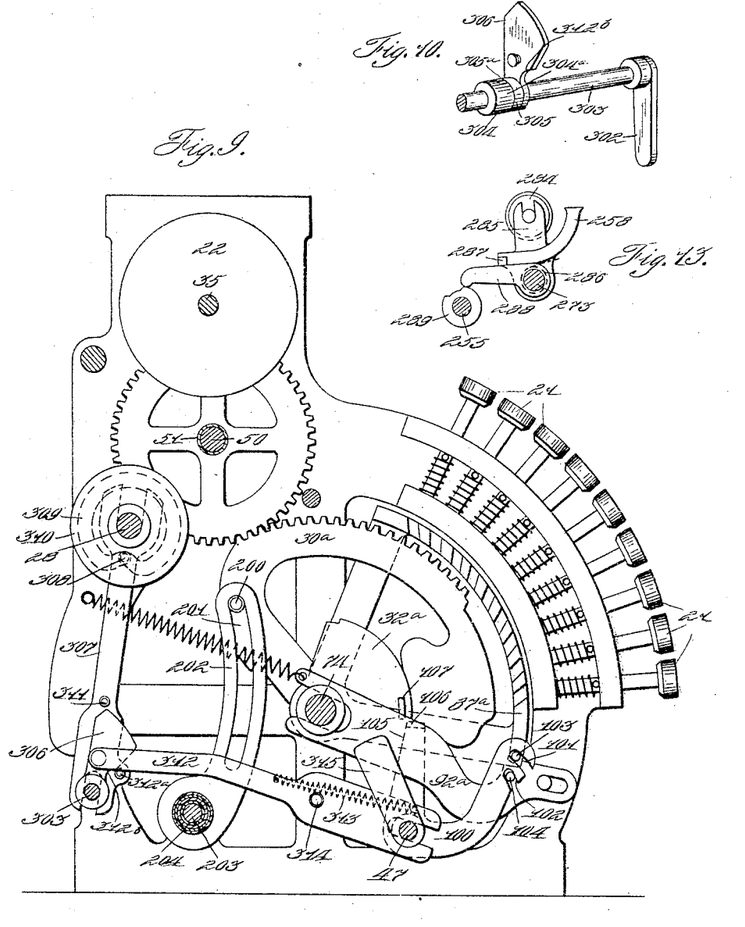
Fig. 9 represents a vertical section through the machine, showing the locking mechanism for locking the operating-shaft while the keys are being moved from initial to final position and also showing the mechanism controlling the throw-out check-feeding device by means of the setting-lever.
Fig. 10 represents a detail perspective view of parts connected with the aforesaid throw-out devices for the check-feed devices.
Fig. 13 represents a detail sectional view of the throw-out mechanism for the ink-roller.

It will be apparent from the construction just described that the clerk operating the machine may by the hand-manipulative knob or sleeve 260 set the machine ready to issue a check or not, as desired, upon the operation of the crank-handle and also by this setting means may position the ink-roller and set the mechanism so that the check-platen will not be operated and simultaneously disable the consecutive-numbering device. However, I have provided means whereby even though this knob 260 be set in such manner as to prevent the issuing of a check, yet upon the movement of the setting-lever 43 into positions designated for the special transactions other mechanism will be moved into such position that upon the operation of the machine the check-feed device will be operated, the ink-roller will be thrown into engagement with its printing-roller, and the check-platen and consecutive-numbering device will also be operated. The mechanism for producing this result is as follows: Fast upon the inner end of the shaft 255 (see Figs. 8 and 11) is a downwardly-extending lever 300, which has pivoted to it a link 301, which in turn is pivoted to a lever 302, extending upward and made fast to a shaft 303, which shaft is suitably journaled in the main frame and has fast upon its other end a collar 304, (see Fig. 10,) which collar is interlocked with a second collar 305, journaled loosely upon the shaft 303 and carrying an upwardly-extending arm 306, which arm is double-beveled or V-shaped at its upper end for the purpose to be described. This interlocking of the aforesaid collars 304 and 305 is effected by means of a projection 304$^a$ on the collar 304 and by a recess 305$^a$ in the collar 305; but there is a slight space between the engaging surfaces of said projection and recess, as shown in Fig. 10, to permit lost motion, for the purpose to be explained. Straddling the shaft 303 (see Fig. 9) are the forked ends of a reciprocating bar 307, which bar is also forked at its upper end to straddle the main operating-shaft 28 and is formed with a pin 308, which projects into a cam-groove 309, formed in a cam-disk 310, fast upon the operating-shaft 28. On the lower end of said bar 307 is a pin 311, so positioned as to engage the beveled surface of the upper end of the arm 306. Attached to the beveled arm 306 is a shifting bar 312, which extends forward and straddles the rock-shaft 47 and is spring-drawn forward by means of a spring 313, and the forward movement of said bar 312 and the attached arm 306, when the parts are in normal position of rest, is limited by a stop-pin 312$^a$, formed upon the lower end of the upright bar 307. Formed on the center portion of this bar 312 is an antifriction-roller 314, which is adapted to be engaged by an arm 315, which is fast to the rock-shaft 47, and thus moves with said shaft upon the shifting of the lever 43. The position of this arm 315 is such that when said lever 43 is moved into any one of the three lower positions this arm will be rocked downward, so as to bring its rearward end into engagement with the pin 314, and thereby force the shifting bar 312 rearward, so that the arm 306 stands with its forward bevel in the path of the pin 311, and upon the downward movement of the reciprocating bar 307 the pin 311 slides over this forward bevel-surface of the arm 306 and forces said arm rearward, thus rocking the shaft 303 by means of the interlocked collars 304 and 305, and as will be evident from the lever-and-link connections between said shaft 303 and the shaft 255 for throwing on and off the check-feed this rearward movement of the arm 306 will rock the lever 300 forward, and thereby cause the shaft 255 to be rocked in such direction that the feed-roller 253 will be brought into engagement with the printing-roller 251, and the other incidents of the rocking of said shaft 255 will also take place—namely, the ink-roller will be thrown into operative position and the check-platen and consecutive device will also be operated. It is thus apparent that this throwing in of the check-feed will take place when the setting-lever 43 is set for any one of the special transactions, regardless of the fact that the hand-manipulative knob 260 has previously been set by the clerk to throw the check-feed off, since the enlarged groove 264 and the annular groove 266 will allow the shaft 255 to have a movement independent of the on and off knob 260. When the setting-lever 43 is in any one of its upper six positions corresponding to the designations of the clerks' initials, the arm 315 is out of engagement with the roller 314, and the shifting lever 312 remains in its normal forward-drawn position, with the arm 306 abutting against the stop-pin 312$^a$, so that the rearward bevel of the arm 306 lies in the path of the pin 311, and upon the downward movement of the bar 307 the arm 306 would be forced forward; but in this position of the setting-lever 43 the position of the arm 306 and the control of the check-feed device is governed by the position of the on and off knob. If the knob 260 is turned to its on position, this rocking of the shaft 255 by the turning of the knob 260 will rock the lever 300 forward, and consequently rock the shaft 303, and by means of the collars 304 and 305 will move the arm 306 rearward, so that its forward bevel will now lie in the path of the pin in the same manner in which it does when moved by the setting-lever 43, and therefore upon the operation of the machine the arm 306 is forced rearward and a check is issued in the manner before described. If, however, with the setting-lever 43 still set at any one of the clerks' initials the knob 260 is turned to off position, then this turning of the shaft 255 by the knob 260 will rock the shaft 303 in such manner that the rearward bevel of the arm 306 remains in the path of the pin 311, and upon the operation of the machine the bar 307 will be reciprocated downward, thereby carrying the stop-pin 312$^a$ into the path of the recess 312$^b$, formed in the beveled arm 306, so that when the pin 311 contacts with the rearward bevel of said arm 306 this arm will be forced forward, and thus will simply rock the eccentric-shaft 255 slightly to a still further extent and still maintain the feed-roller out of operative position.

By means of having the lost motion between the collars 304 and 305 as above described the shifting bar 312 can resume its normal position when its roller 314 is free from the arm 315, and it will not be held in shifted position in case the eccentric-shaft 255 is held by friction in position to throw on the check—that is, if the bar 312 is shifted by the movement of the setting-lever 43, so as to issue a check for one of the special transactions and then upon the operation of the machine the shaft 255 is rocked so as to issue a check, if the lever 43 is then moved to a clerk's-initial position a solid connection between the collars 304 and 305 would result in holding the arm 312 in its shifted position, due to the frictional holding of the shaft 255 in its operated position, and thereby upon the next operation of the machine a check would be issued even though the hand-knob 260 were set for off position and the lever 43 set at the clerk's-initial position. Such a result is prevented by the lost-motion connection between said collars 304 and 305, and upon the movement of the setting-lever from the special-transaction positions to the clerk's-initial positions the shifting bar 312 may freely be drawn forward again into normal position.

Having thus described my invention, what I claim as new, and desire to secure by Letters Patent, is as follows:

1. In a cash-register, the combination with an adjustable setting member and a series of keys, of means controlled by said setting member for locking certain of said keys while unlocking the remainder according to the adjustment of the setting member, substantially as and for the purpose described.

2. In a cash-register, the combination with a movable carriage arranged to be moved to various positions with provisions for securing an entry of the various transactions in segregated groups, of setting means for determining the position of adjustment of said carriage for any one of said groups, a series of keys corresponding in designation to said groups, and means controlled by said setting means for locking certain of said keys while unlocking the remainder according to the operation of said setting means.

3. In a cash-register, the combination with a series of accounting devices, of setting means for determining which of said devices shall be operated, a series of keys corresponding in designation to said devices, and means controlled by said setting means for locking certain of said keys while unlocking the remainder according to the adjustment of the setting member, substantially as and for the purpose described.

4. In a cash-register, the combination with a series of accounting devices, of setting means for determining which of said devices shall be operated, a series of keys corresponding in designation to said devices, and means for preventing the operation of any of said keys except the one corresponding to the accounting device set for operation.

5. In a cash-register, the combination with a series of accounting devices, of setting means for determining which of said devices shall be operated, a series of keys corresponding in designation to said devices, individual locks for said keys, and means controlled by said setting means for coöperating with the lock for that key which corresponds with the accounting device set for operation.

6. In a cash-register, the combination with a series of accounting devices, of setting means for predetermining which of said devices shall be operated, a series of keys corresponding in designation to said devices, individual locks for said keys, and means controlled by said setting means for releasing the lock of the key corresponding to the accounting device set for operation.

7. In a cash-register, the combination with a series of accounting devices, of setting means for determining which of said devices shall be operated, a series of keys corresponding in designation to said setting devices, means controlled by said setting means for locking certain of said keys while unlocking the remainder according to the adjustment of the setting means, and means for permitting the operation of any of said keys when said setting means is moved into a certain position.

8. In a cash-register, the combination with a series of accounting devices, of setting means for determining which of said devices shall be operated, a series of keys corresponding in designation to said devices, means controlled by the setting means for preventing the operation of any of said keys except the one corresponding to the accounting device set for operation, and means for permitting the operation of any of said keys when said setting means is moved into a certain position.

9. In a cash-register, the combination with a series of accounting devices, of setting means for determining which of said devices shall be operated, a series of keys corresponding in designation to said devices, individual locks for said keys, lock-operating means controlled by said setting means for permitting the operation of only that key which corresponds to the accounting device set for operation, and means for releasing all of said locks simultaneously.

10. In a cash-register, the combination with a series of counters mounted upon a revoluble drum, of a setting-lever for moving said drum to bring the desired counter into operative position, operating mechanism for said counters, a series of special keys corresponding in designation to said counters and formed with locking projections, a series of individual locking-pawls coöperating with said locking projections, and a lock-operating lever connected with said setting-lever and arranged to contact successively with said locking-pawls and move the same out of locking position.

11. In a cash-register, the combination with a series of counters mounted upon a revoluble drum, of a setting-lever for moving said drum to bring the desired counter into operative position, operating mechanism for said counters, a series of special keys corresponding in designation to said counters and formed with locking projections, a series of individual locking-pawls coöperating with said locking projections and mounted upon a movable plate, a lock-operating lever connected with said setting-lever and arranged to contact successively with said locking-pawls and move the same out of locking position, and a second lever connected with said setting-lever arranged to engage said movable plate and thereby move all of said locking-pawls out of locking position.

12. In a cash-register, the combination with a series of counters mounted upon a revoluble drum, of a setting-lever for moving said drum to bring the desired counter into operative position, operating mechanism for said counters, a series of special keys corresponding in designation to said counters and formed with locking projections, a series of individual locking-pawls coöperating with said locking projections, a lock-operating lever connected with said setting-lever, a lock-operating pawl carried upon said lever arranged to engage the aforesaid locking-pawls, a latch carried on said setting-lever, and a lever connected with said latch and arranged to engage said lock-operating pawl to carry the latter into engagement with said locking-pawls when the latch is in normal position.

13. In a cash-register, the combination with a series of counters mounted upon a revoluble drum, of a setting-lever for moving said drum to bring the desired counter into operative position, operating mechanism for said counters, a series of special keys corresponding in designation to said counters and formed with locking projections, a series of individual locking-pawls coöperating with said locking projections and mounted upon a movable plate, a lock-operating lever connected with said setting-lever, a lock-operating pawl carried upon said lever arranged to engage the aforesaid locking-pawls, a latch carried on said setting-lever, a lever connected with said latch and arranged to engage said lock-operating pawl to carry the latter into engagement with said locking-pawls when the latch is in normal position, and a lever connected with said setting-lever arranged to contact with said movable plate and move all of said locking-pawls out of locking position.

14. In a cash-register, the combination with an adjustable setting member, of a latch therefor, a series of keys, a locking mechanism therefor, and means operated by said latch for unlocking said keys according to the adjustment of said setting member.

15. In a cash-register, the combination with a series of accounting devices, of setting means for determining which of said devices shall be operated, a latch for said setting means, a series of keys corresponding in designation to said devices, locking devices for said keys, and means actuated by said latch for controlling said locking devices.

16. In a cash-register, the combination with a series of accounting devices, of setting means for determining which of said accounting devices shall be operated, a series of keys corresponding in designation to said devices, a latch for said setting means, means for locking all of said keys when said setting means is unlatched, and means for selectively unlocking said keys when said lever is latched.

17. In a cash-register, the combination with a series of accounting devices, of setting means for determining which of said devices shall be operated, a series of keys corresponding in designation to said devices, a series of individual locks for said keys, a latch for said setting means, and means connected with said latch for selectively operating said locks according to the position of said setting means.

18. In a cash-register, the combination with an adjustable setting member, of an operating mechanism, a latch movably mounted upon said setting member, and means controlled by said latch for locking said operating mechanism.

19. In a cash-register, the combination with an adjustable setting member, of a series of keys, an operating mechanism, a latch for said setting member, a locking mechanism for said operating mechanism, a locking mechanism for said keys, and means connected with said latch for controlling both of said locking mechanisms.

20. In a cash-register, the combination with an adjustable setting member, of a series of keys, and means intermediate said member and said keys for locking the latter while the former is being moved.

21. In a cash-register, the combination with an adjustable setting member, of a series of keys, and means intermediate said member and said keys for locking the setting member after the initial movement of the depression of a key.

22. In a cash-register, the combination with an adjustable setting member and a series of keys, of means intermediate said member and said keys for locking the latter while the former is being moved and for locking the former when a key is displaced from normal position.

23. In a cash-register, the combination with an adjustable setting member and a series of keys, of a latch for said setting member, and means controlled by said latch for locking said keys.

24. In a cash-register, the combination with an adjustable setting-lever and a series of keys, of a latch for said setting-lever, a lever operated by said latch and formed with a locking projection, a detent for said series of keys, a lever moved by said key-detent and provided with a locking projection arranged to coöperate with the first-mentioned locking projection whereby to lock said keys after said latch has been operated and to lock said latch after said keys have been operated.

25. In a cash-register, the combination with a series of accounting devices, of a lever for bringing any one of said devices into operative position, a latch for said lever, a special indicator connected to said lever, a shutter for said indicator, a latch for said shutter, and means connected to said lever-latch for operating said shutter-latch.

26. In a cash-register, the combination with a series of keys and an operating mechanism, of a detent for said keys, a locking device for said operating mechanism, and a movable member for controlling said locking device, mounted independently of said detent and held in stationary position thereby during the initial movement of the detent but released upon the final movement of the detent.

27. In a cash-register, the combination with a series of keys and an operating mechanism, of a detent for said keys, a retaining-bar for said detent to hold the detent in position, and means controlled by said retaining-bar for locking the operating mechanism.

28. In a cash-register, the combination with a series of keys and an operating mechanism one member of which is formed with a locking projection, of a detent for said keys, and a retaining-bar for said detent to hold the same in position to latch the operated key or keys, and having an abutment for engaging said locking projection until said detent is moved into position to latch the operated key.

29. In a cash-register, the combination with a series of keys and an operating mechanism, of means for locking the operating mechanism while the keys are moving from initial to final position, and means released by the keys upon reaching their final position for displacing said locking means.

30. In a cash-register, the combination with a series of keys and an operating mechanism, of a detent for said keys, means connected with said detent for locking said operating mechanism during the movement of said keys from initial to final position, and a retaining-bar released by said detent upon the final movement of said keys and arranged to hold said detent in position to latch said keys, with provisions connected with said retaining-bar for displacing said locking means.

31. In a cash-register, the combination with a series of keys and an operating mechanism one member of which is formed with a locking projection, of a detent for said keys, a locking-abutment connected with said detent and arranged to be moved into the path of said locking projection upon the movement of said detent, a retaining-bar released by said detent when the keys are fully depressed and arranged to hold said detent into position to latch said keys, with provisions connected with said retaining-bar for displacing said abutment out of locking position.

32. In a cash-register, the combination with an adjustable setting member, of a printing mechanism, and check-strip-feeding devices arranged to be thrown into and out of operative position, an operating mechanism and means connected therewith for effecting the operative adjustment of said feeding devices, and means actuated by said adjustable setting member when in certain positions to prepare said feeding devices for such adjustment by said operating mechanism.

33. In a cash-register, the combination with an adjustable setting member and an operating mechanism, of a printing mechanism including a type-roller, a feed-roller, a platen and an ink-roller, means connected with said operating mechanism for effecting an operative adjustment of said printer element, and means controlled by said adjustable member for preparing the said element for such adjustment by said operating mechanism.

34. In a cash-register, the combination with an adjustable setting-lever arranged to be set in various positions, and an operating mechanism; of a printing device comprising a type-roller, a feed-roller, an ink-roller, a platen-operating means and a platen; hand-manipulative means for disabling said feed-roller, ink-roller and platen-operating means; and means controlled by said setting-lever when in certain positions for preparing said feed-roller, ink-roller and platen-operating means to be thrown into operative position upon the movement of said operating mechanism regardless of the operation of said hand-manipulative means; and means connected with said operating mechanism for moving said feed-roller, ink-roller, and platen-operating means into operative position.

35. In a cash-register, the combination with an adjustable setting-lever and an operating mechanism; of a printing device comprising a type-roller, a feed-roller, an ink-roller and platen-operating means, and a platen; hand-manipulative means for disabling said feed-roller, ink-roller and platen-operating means; a rock-lever connected with said feed-roller for positioning the same; a double-beveled lever connected with said rock-lever; a shifting bar connected with said double-beveled lever; means connected with said setting-lever for operating said shifting bar; an operating bar connected with said operating mechanism and formed with a projection to engage the beveled surfaces of said double-beveled lever whereby to rock the latter in one direction or the other according to the adjustment of said shifting bar.

36. In a cash-register, the combination with an adjustable setting-lever and an operating mechanism; of a printing device comprising a type-roller, a feed-roller, an ink-roller and platen-operating means, and a platen; hand-manipulative means for disabling said feed-roller, ink-roller and platen-operating means; a rock-lever connected with said feed-roller for positioning the same; a double-beveled lever connected with said rock-lever with provisions for lost motion between said double-beveled lever and said rock-lever; a shifting bar connected with said double-beveled lever; means connected with said setting-lever for operating said shifting bar; an operating-bar connected with said operating mechanism and formed with a projection to engage the beveled surfaces of said double-beveled lever whereby to rock the latter in one direction or the other according to the adjustment of said shifting bar.

37. In a cash-register, the combination with a series of accounting devices, of a setting-lever for determining which of said accounting devices shall be operated; a series of special counters for registering the number of operations of certain of said accounting devices; a totalizing-register device; an actuating mechanism therefor; actuating mechanism for said special counters; means connected with said setting-lever for positioning said special counter-actuating mechanism; and means connected with the special counter-actuating mechanism for preventing the operation of said totalizing-register.

38. In a cash-register, the combination with a series of accounting devices, of a setting-lever for determining which of said accounting devices shall be operated; a series of special counters for registering the number of operations of certain of said accounting devices; a totalizing-register device; an actuating mechanism therefor; actuating mechanism for said special counters; a sliding shaft connected with said setting-lever for positioning said special counter-actuating mechanism; a throw-out lever for throwing said totalizing-register device out of operation, and an arm carried by said sliding shaft and formed with a projection for effecting an engagement between said shaft and said throw-out lever whereby to prevent the operation of the totalizing-register when said setting-lever is moved to certain positions.

39. In a cash-register, the combination with an adjustable setting member, of an operating mechanism, a lock for said operating mechanism, a latch movably mounted upon said setting member, and means connected with said latch for controlling said lock.

40. In a cash-register, the combination with an adjustable setting member, of a series of keys, a locking mechanism for said keys, a latch movably mounted upon said setting member, and means connected with said latch for controlling said key-locking mechanism.

41. In a cash-register, the combination with an adjustable setting member, of a series of keys, a locking mechanism for said keys, a latch movably mounted upon said setting member, and means connected with said latch for locking said keys when said latch is withdrawn from latching position, and for selectively unlocking said keys according to the adjustment of said setting member when said latch is in latching position.

In testimony whereof I affix my signature in the presence of two witnesses.

THOMAS CARROLL.

Witnesses:
JOHN C. LOCKYER,
SAMUEL D. HENDERSHOTT.